UNITED STATES PATENT OFFICE.

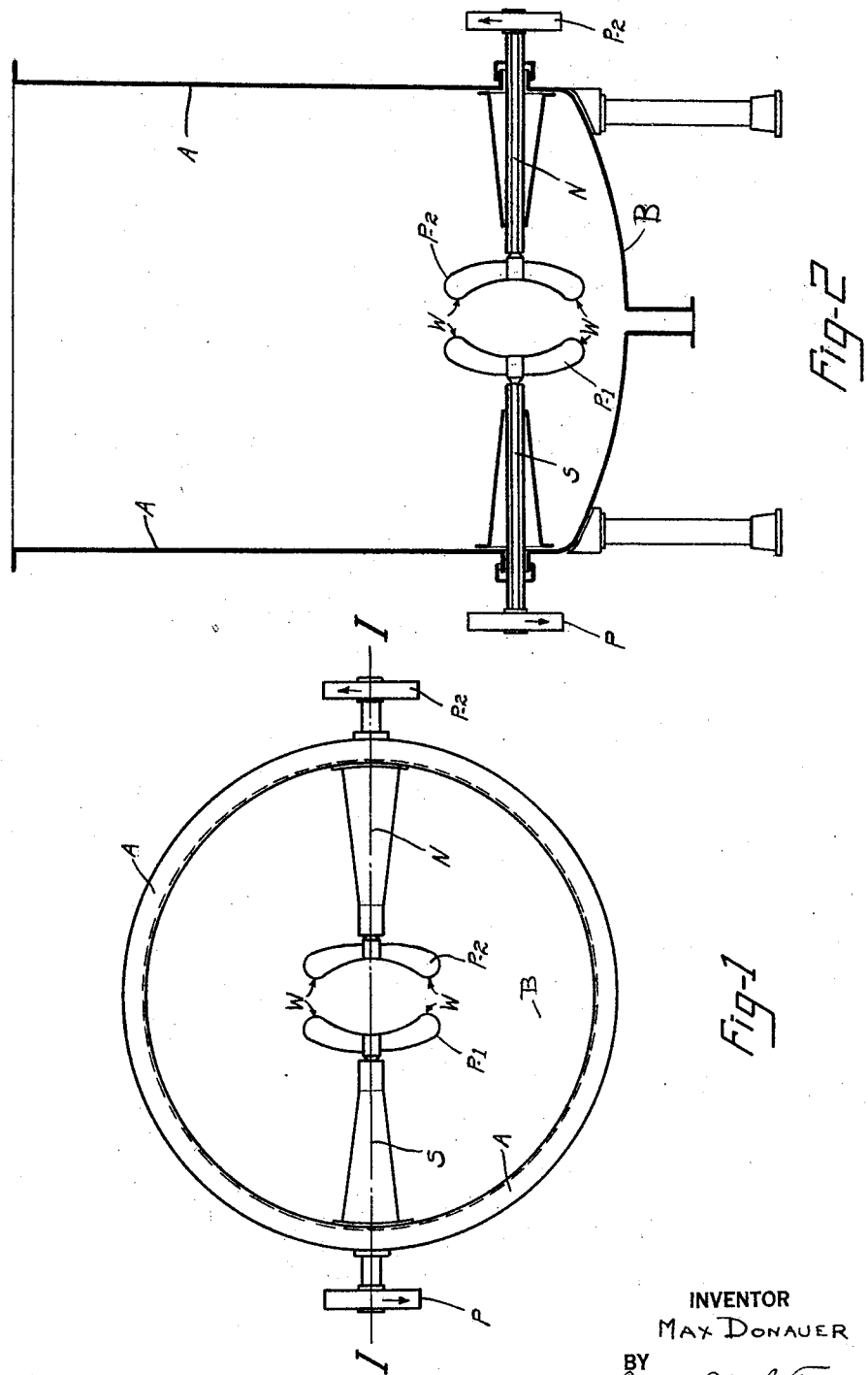

MAX DONAUER, OF ELYRIA, OHIO, ASSIGNOR TO THE ELYRIA ENAMELED PRODUCTS COMPANY, OF ELYRIA, OHIO, A CORPORATION OF OHIO.

AGITATING MECHANISM.

1,406,355.

Specification of Letters Patent. Patented Feb. 14, 1922.

Application filed October 27, 1920. Serial No. 419,811.

*To all whom it may concern:*

Be it known that I, MAX DONAUER, a resident of the United States, residing at Elyria, in the county of Lorain and State of Ohio, have invented certain new and useful Improvements in Agitating Mechanisms; and I do hereby declare the following to be a full, clear, concise, and exact description of the same, such as will enable others skilled in the art to which my invention appertains to make and use the same.

My invention relates to agitating mechanism and more particularly to that form of mechanisms in which a liquid containing vessel is employed in combination with a rotating stirring device which may be operated by a suitable source of power to cause intermingling of liquid particles contained in the vessel.

An object of my invention is to provide in such a mechanism, a combination of elements which are simple and inexpensive to manufacture, to assemble, to maintain sanitary, and which will operate efficiently and with little attention for a long period of time. Other objects of my invention and the invention itself, will be apparent from the description of an embodiment thereof, and in which description reference will be had to the drawings accompanying this specification. Referring to the drawing:

Fig. 1 shows a plan view of an embodiment of my invention comprising a cylindrical tank and agitating mechanism mounted therein.

Fig. 2 shows a side view partly in section along the line II of Fig. 1.

Referring now to the figures at "A," I show the cylindrical side walls of a tank having preferably, a downwardly dished bottom wall "B." Passing through the side walls, at points substantially opposite to each other, are a pair of propeller-shafts S and N upon the inner ends of which are mounted respectively, propellers P and P². Upon the outer ends of the shafts S and N are mounted pulleys P and P² whereby the shafts may be rotated by means of belts passed over the pulleys and movable by a suitable source of power, as by an electric motor.

I preferably arrange the propellers face to face near the center of a dished bottom tank and mounted on horizontal rotating shafts, although they may be placed otherwise, so far as my invention in some of its broader aspects is concerned.

An essential distinction between the propellers placed as according to the present invention, and as has been previously proposed in prior constructions, is that in the device of my invention I place the propellers so that their opposing faces are relatively close together, so as to produce a restricted path for the flow of water from or to the enclosed space between the propellers, depending upon the direction of rotation.

I also preferably construct the propellers alike as to pitch, but being oppositely mounted in the tank, they are rotating in opposite directions so as to tend to neutralize each that effect of the other upon the liquid contents of the tank which in each case, if unopposed, would cause the liquid contained in the tank to have a strong tendency to rotate with the propeller and about its axis of rotation, and a prolongation thereof. However, my invention may be practiced in some of its more specific aspects without consideration of this feature of pitch as above outlined.

I prefer, for most purposes, to operate the propellers of my improved device in opposite directions, as indicated by the arrows shown on the pulleys P and P², and I prefer to have the propellers so pitched that each propeller per se will be a righthand propeller, but I may also operate these propellers for other purposes, in the directions indicated, and with the pitch of each corresponding to that of a left-hand propeller.

Of course, if the direction of rotation as indicated by the arrows is reversed, to secure the same result, the pitch of the propellers would be reversed. But in every case, I prefer to have the distance $w$ between the propeller blades relatively small as compared with the distance represented by the length of the diameter of the tank.

When the device of my invention is operating in the direction as shown by the arrows, or oppositely, due to the relatively small distance $w$ between the propeller blades, the contents of the tank passing from the propellers, are thrown peripherally of the propeller set and passing from there in all directions aganist the tank bottom and against the side walls of the tank.

In the device of my invention, the propellers may be caused to operate in such a direction as to throw fluids peripherally, fluid being drawn in from in front and behind each propeller.

I also find that when the propellers are each oppositely rotated, the same general effects are produced, although some of the fluid currents produced are different in a way difficult to describe, but in such a way that the result secured, namely, that of thorough intermingling of the different particles comprised in the tank contents, is secured.

I realize these results in both cases by the arrangement of the propellers in close proximity of each other, causing a restriction of the path between the ends of the propeller blades, which path is in the line of communication from the space between the propellers to the space outside of the propellers.

While I have illustrated a specific embodiment of my invention, I wish it understood that I do not wish to be limited to the said embodiment, as I am aware that numerous and extensive departures may be made from the embodiment illustrated, but without departing from the spirit of my invention, and I am aware that the novel mode of operation herein described, may be realized in toto or en parte.

I claim:

1. In a device of the class described, the combination with a fluid containing vessel, said vessel having cylindrical, vertical side walls and a bottom wall, of a pair of alike pitched propellers, each adapted to rotate within the vessel, said propellers being adapted to rotate in opposite directions and in substantially parallel vertical planes of such a size and positioned so closely adjacent to each other that when so rotated the suction or "fluid drag" between the propellers will cause the propeller projected fluid currents to pass nearly radially from the propeller blades.

2. In a device of the class described, the combination with a fluid containing vessel, said vessel having cylindrical, vertical side walls and a bottom wall, of a pair of alike pitched propellers, each adapted to rotate within the vessel, said propellers being adapted to rotate in opposite directions and in substantially parallel vertical planes of such a size and positioned so closely adjacent to each other and to the bottom wall that when so rotated the suction or "fluid drag" between the propellers will cause the propeller projected fluid currents to pass nearly radially from the propeller blades.

In testimony whereof, I have hereunto signed my name this 22nd day of October, 1920.

MAX DONAUER.